United States Patent [19]

Finn

[11] Patent Number: 4,505,313

[45] Date of Patent: Mar. 19, 1985

[54] CYLINDRICAL WEDGE

[75] Inventor: Arnold H. Finn, Farmington, Conn.

[73] Assignee: Taco Products, Incorporated, Plainville, Conn.

[21] Appl. No.: 342,177

[22] Filed: Jan. 25, 1982

[51] Int. Cl.³ .............................................. B25D 1/00
[52] U.S. Cl. ..................................... 145/29 R; 145/36; 145/61 R; 279/9 R; 403/248; 403/251
[58] Field of Search ............... 279/9 R; 403/248, 250, 403/251, 409; 145/61 R, 29 R, 36; 83/684, 669, 97, 164; 408/67, 68; D8/75; 76/103, 109; 254/26, 26 E

[56] References Cited

U.S. PATENT DOCUMENTS

| 487,778 | 12/1892 | Sanders | 145/36 |
| 879,382 | 2/1908 | Harris | 145/61 R |
| 1,399,172 | 12/1921 | Vaughan | 145/29 R |
| 1,932,239 | 10/1933 | Berry | 408/67 |
| 2,187,651 | 1/1940 | Jackson | 83/97 |
| 2,214,666 | 9/1940 | Elf et al. | 408/68 |
| 2,846,277 | 8/1958 | Marsh | 403/248 |

FOREIGN PATENT DOCUMENTS

| 438594 | 12/1948 | Italy | 403/251 |
| 455184 | 2/1950 | Italy | 83/684 |

OTHER PUBLICATIONS

American Machinist, McGraw-Hill Book Co., "Shop Tools, Appliances and Expedients", Sep. 6, 1917.

Primary Examiner—Z. R. Bilinsky
Assistant Examiner—Thomas M. Kline
Attorney, Agent, or Firm—McCormick, Paulding & Huber

[57] ABSTRACT

A cylindrical wedge for holding a tool head on a wooden tool handle has a tapered exterior surface and a central bore containing a throat section that is dimensionally smaller than the openings at either end of the bore. When the wedge is embedded in a wooden handle, the tapered exterior surface spreads the handle within the eye of the tool, and the throat section grips the handle core to hold the wedge securely in the handle.

12 Claims, 5 Drawing Figures

CYLINDRICAL WEDGE

BACKGROUND OF THE INVENTION

The present invention relates to wedges of the type used to spread a wooden handle within a tool head to secure the head firmly on the end of the handle. More particularly, the present invention is related to a cylindrical wedge that has unique features to improve the holding force of the wedge.

Cylindrical wedges are known in the art for securing tool heads on wooden handles. Such wedges are typically made in screw machines and have a configuration corresponding generally to that shown in FIG. 1. The prior art wedges have a tapered cylindrical configuration on the exterior surface and a straight-walled central bore extending between opposite ends of the wedge except for a small chamfer which defines the cutting edge at the narrow end. The tapered exterior surface is utilized to spread the wooden handle in the eye of a tool, and in order to secure the wedge more firmly within a handle, it is common to provide sharp-edged undercuts or circumferential grooves in the tapered exterior surface for increased friction.

The prior art cylindrical wedges are relatively expensive to make and require a substantially greater amount of raw material than appears in the finished product when made on a screw machine. Additionally, the straight inside wall of the central bore only compresses the core of the wooden handle by a limited amount and does not contribute significantly to the holding force which prevents the wedge from being dislodged from the handle. Also, the grooves in the tapered exterior surface are recessed below the surface, and as a result, wood fibers in the handle can bridge the grooves with only limited increases in the retention forces.

It is accordingly an object of the present invention to provide an improved cylindrical wedge that develops significant holding forces on the tool head and high retention forces on the wedge itself. It is a further object to provide a cylindrical wedge which can be manufactured at reduced cost with less waste of raw material.

SUMMARY OF THE INVENTION

The present invention resides in a cylindrical wedge for holding a tool head on a wooden handle. The wedge is comprised by a body having a generally cylindrical shape with interior and exterior body surfaces and a hollow central bore extending from a first axial end of the shape to the opposite, second axial end. The wall thickness of the body between the interior and exterior surface tapers to a cutting edge at the second axial end for ease of penetration when the wedge is driven into the end of a wooden handle. Preferably, the exterior surface is tapered along one portion to spread the wooden handle and produce high holding forces on the tool head.

The interior surface defines a throat section in the hollow central bore with a smaller cross sectional area at the throat than at the second axial end of the bore. With this construction, the core of the wooden handle that is located inside the embedded wedge captures the wedge with a high retention force to prevent the wedge from being dislodged.

DESCRIPTION OF THE PREFERRED EMBODIMENTS

Figure 1:
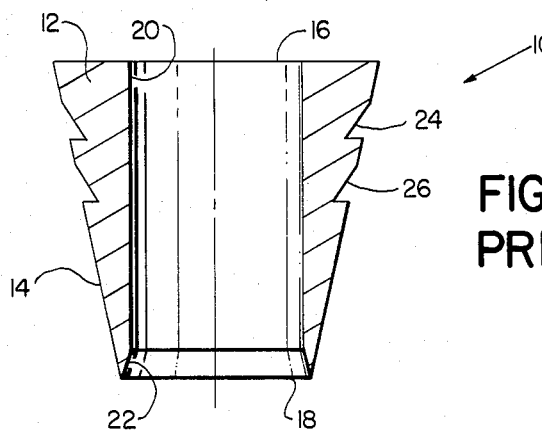
FIG. 1 illustrates a prior art cylindrical wedge for holding a tool head on a wooden handle.

FIG. 1 illustrates a cylindrical wedge constructed in accordance with the prior art techniques. The wedge, generally designated 10, has a generally cylindrical body 12 with a tapered exterior surface 14 extending between the opposite axial ends of the wedge. The surface 14 tapers uniformly along the axial length of the wedge from a larger diametral dimension at the upper axial end 16 to a smaller diametral dimension at the opposite, lower axial end 18.

The wedge 10 has a straight-walled cylindrical bore 20 which terminates at the lower end 18 in a chamfer 22 to define a cutting edge for ease of penetration in a wooden handle. A set of undercuts or grooves 24, 26 in the external surface 14 circumscribes the cylindrical wedge to increase the friction and holding forces that retain the wedge in an embedded position within a wooden handle. It will be observed that the wall thickness of the wedge 10 is not uniform, and in fact, has a taper which spreads the tool handle in the eye of a tool. But the taper also develops expulsion forces which tend to remove the wedge from its embedded position within the handle. To overcome the expulsion forces, the central bore 20 of the wedge develops compressive forces and, to a limited extent, grips the wood core of the handle while the grooves 24, 26 embrace the surrounding wood.

Figure 2:
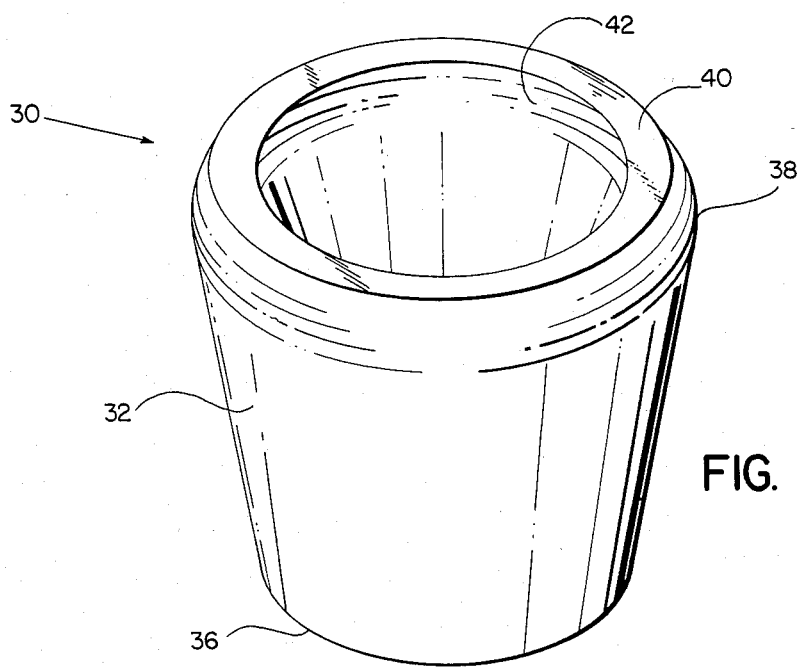
FIG. 2 is a frontal perspective view of the improved cylindrical wedge of the present invention.
Figure 3:
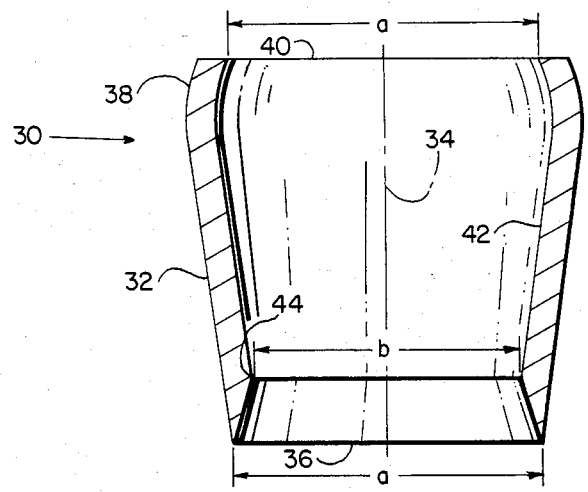
FIG. 3 is a cross sectional view of the improved cylindrical wedge in FIG. 2.

In contrast to the prior art wedge 10 of FIG. 1, FIGS. 2 and 3 illustrate an improved cylindrical wedge, generally designated 30 in accordance with the present invention. The wedge 30 has a circularly symmetric cylindrical body with a portion of the exterior surface 32 tapering inwardly toward the central axis 34 at the lower axial end 36 from an intermediate station 38 located adjacent the upper end 40. Between the station 38 and the upper end, however, the exterior surface 32 has another portion tapering inwardly toward the central axis 34. The lower portion of the surface 32 between station 38 and the end 36 serves to spread the wood when the wedge is driven into a handle, and the upper portion of the surface between the station 38 and the end 40 allows the handle to close against the wedge and provide at least limited restraining forces to stop the wedge from working out of the handle.

It will also be observed in the cross sectional view of FIG. 3 that the wall thickness of the wedge 30 between the inner surface 42 and the outer surface 32 is substantially uniform along the axial length of the wedge except for a small tapered portion adjacent the lower end 36 which forms a sharp, circumaxial cutting edge where the inner and outer surfaces meet. The uniform thickness enables the wedge to be made from flat stock without the substantial machining that is associated with manufacture of the prior art wedge 10 in a screw machine. The sharp cutting edge facilitates penetration when the wedge is driven into a tool handle.

FIG. 3 also illustrates a throat section 44 that is defined by smooth contours on the inner surface 42 and the tapered wall portion between the lower end 36 and the throat of the hollow central bore. The bore has a smaller cross sectional area at the throat than at other stations along the central axis 34 including the opening at the lower end 36. The diametral dimension a at the lower end is shown to be clearly larger than the diametral dimension b at the throat, and the smaller cross sectional area resulting at the throat due to this dimensional relationship is intended to increase the retention forces that hold the wedge embedded in a handle as explained in greater detail below.

Figure 4:
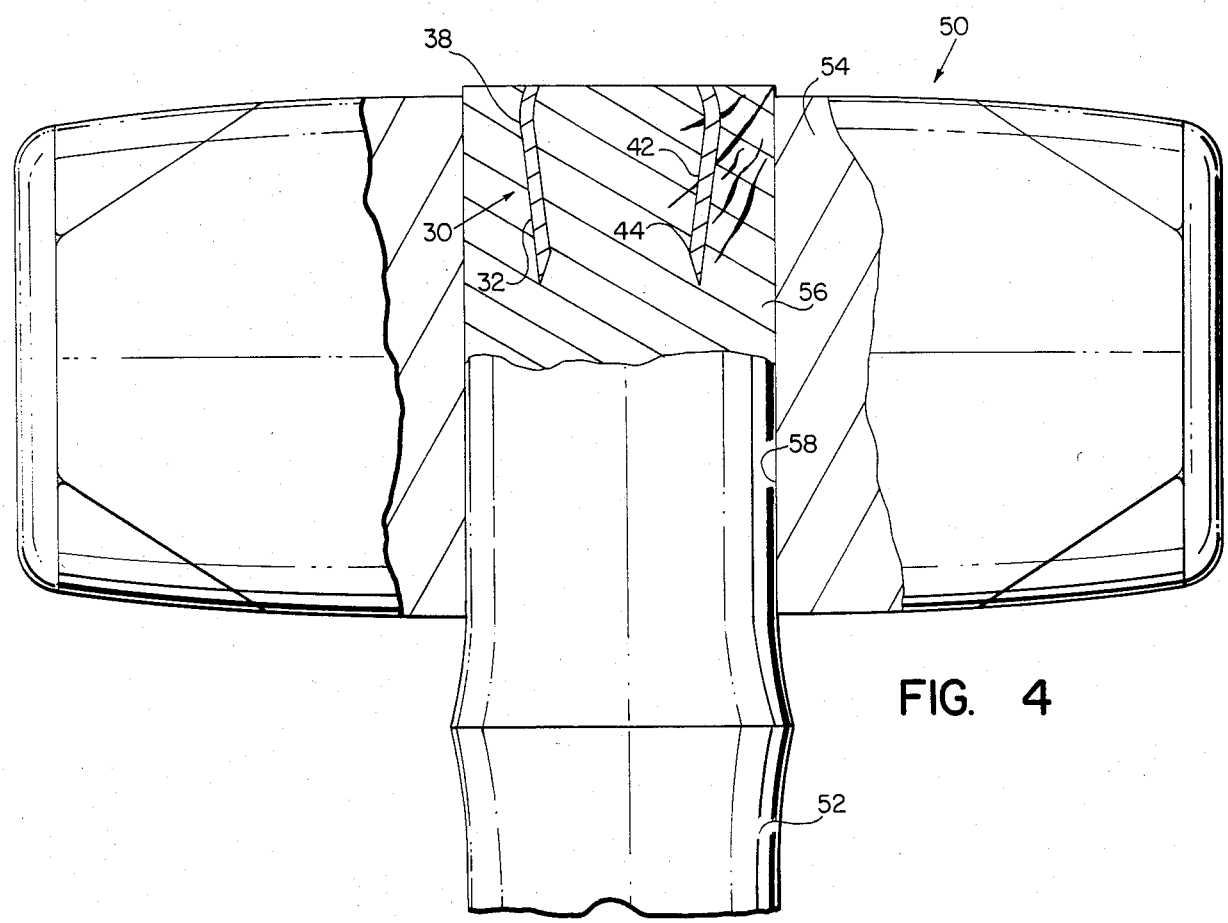
FIG. 4 illustrates a tool head and wooden handle partially in section with the improved cylindrical wedge of the present invention embedded in the end of the handle.
Figure 5:
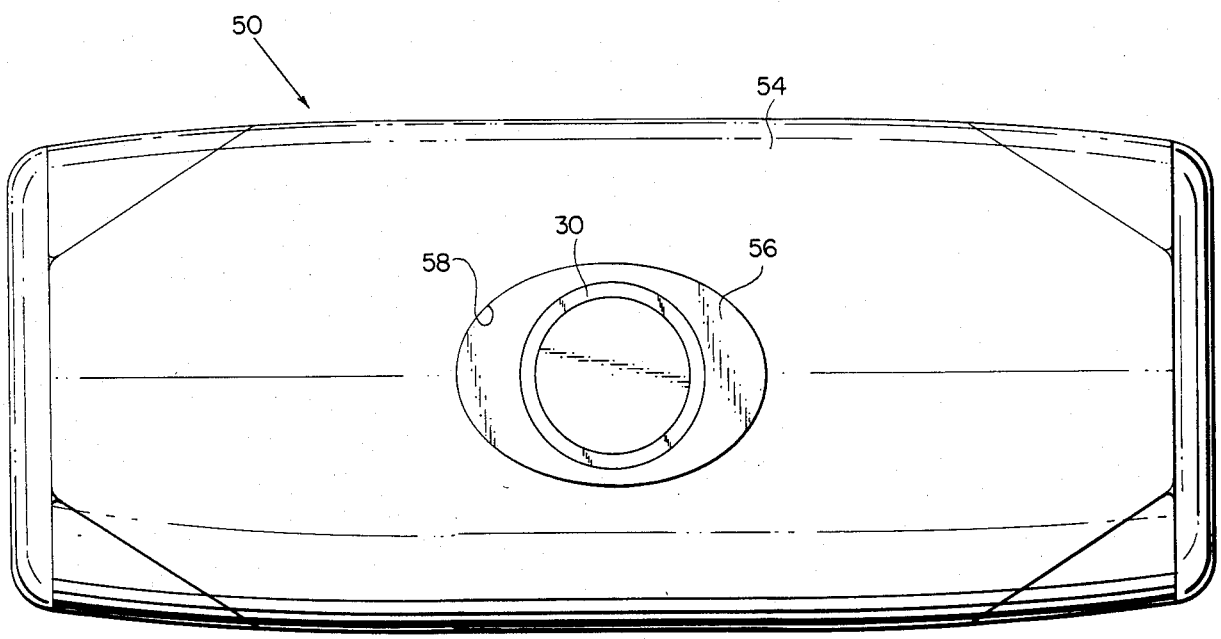
FIG. 5 is a plan view of the tool head, handle and wedge in FIG. 4.

FIGS. 4 and 5 illustrate a tool in the form of a sledge hammer 50 which is comprised by a tool handle 52 and a sledge head 54. The end 56 of the handle is inserted into the oval eye 58 at the center of the head 54, and the improved cylindrical wedge 30 of the present invention is driven into the handle to hold the head securely on the handle. The wedge 30 is embedded along substantially its entire axial length as shown in FIG. 4 so that the upper portion of the wedge above the station 38 is embraced by the surrounding wood of the handle. The embracing wood restrains the wedge against any tendency to work out of the end of the handle during use of the sledge hammer 50, and seals against the exterior surface of the wedge to prevent the entry of moisture.

When the wedge 30 is driven into the handle 52, the tapered exterior surface 32 below the station 38 spreads the surrounding wood in compressed relationship within the eye 58 to hold the head 54 securely on the handle. The narrow throat 44 in the central bore of the wedge compresses the central core of wood located in the throat section. That portion of the wood core above the throat 44 is not subjected to the same degree of compression, but is more expanded to effectively capture and retain the wedge in the embedded position.

In the preferred embodiment of the wedge as shown in FIG. 3, the axial opening at the lower end 36 has the same dimensions and corresponding cross sectional area as the axial opening at the upper end 40. Consequently, when the wedge 30 is driven into the wooden handle 52, the central core of wood in the opening of the wedge at the upper end 40 is not permitted to expand in spite of the tapered shape of the wedge exterior and the uniform wall thickness. Thus, the end grain of the wood handle which is typically exposed in the eye 58 of the head 54 is not expanded, and seals the wood in the core. As stated above, the wood surrounding the wedge is compressed due to the volume occupied by the wall of the wedge so that sealing across the entire end grain is promoted. If desired, of course, a moisture-proof barrier or sealant may be added over the wedge and end grain.

Accordingly, an improved cylindrical wedge has been disclosed which has a substantially uniform wall thickness along its length for more economical manufacture with less waste of material. The wedge has a tapered exterior surface for spreading a wooden handle in the eye of a tool and a throat section on the interior surface to capture the wedge securely within the handle.

While the present invention has been described in a preferred embodiment, it should be understood that numerous modifications and substitutions can be had without departing from the spirit of the invention. For example, although the wedge 30 described above is a circularly symmetric cylindrical wedge, it should be understood that other shapes including oval, elliptical and other closed cylindrical shapes can be employed. Also, if desired, one or more circumferential grooves can be formed in the exterior surface of the wedge to additionally restrain the wedge from being dislodged from the wooden handle. The throat section 44 is preferably situated adjacent the cutting edge of the wedge as shown in FIG. 3; however, the throat could be located at other stations along the central axis 34. The positioning of the throat adjacent the lower end permits the otherwise uniform wall thickness of the wedge to taper into the cutting edge at the lower end 36. Accordingly, the present invention has been described in a preferred embodiment by way of illustration rather than limitation.

I claim:

1. A cylindrical wedge for holding a tool head on a wood handle comprising:
    a hollow body having a generally tapered, cylindrical shape with oppositely disposed first and second axial ends, interior and exterior body surfaces defining a body wall and a central bore extending from the first axial end of the shape to the opposite, second axial end, the thickness of the wall between the interior and exterior surfaces tapering to a circumaxial cutting edge at the second axial end for ease of penetration into wood, and the interior surface of the cylindrical shape defining a throat section in the central bore intermediate the first and second axial ends with the bore having a smaller cross sectional area at the throat than elsewhere along the bore between the first and second axial ends.

2. A cylindrical wedge for holding a tool head as defined in claim 1 wherein the throat section in the central bore is located a shorter distance from the second axial end than from the first axial end.

3. A cylindrical wedge for holding a tool head as defined in claim 1 wherein the exterior body surface of the cylindrical shape is tapered along a substantial portion of the surface between the first and second axial ends.

4. A cylindrical wedge for holding a tool head as defined in claim 3 wherein the central bore of the cylindrical shape has an opening at each axial end, and the openings have approximately the same cross sectional areas.

5. A cylindrical wedge for holding a tool head as defined in claim 3 wherein a small portion of the exterior body surface adjacent the first axial end tapers inwardly from a wide section of the cylindrical body intermediate the axial ends toward a more narrow section of the cylindrical body at the first axial end, and a large portion of the exterior body surface tapers inwardly from the wide section of the cylindrical body toward a more narrow section at the second axial end.

6. In combination a tool having a tool head with an eye and a wood handle inserted at one end into the eye in tight-fitting relationship, an improved cylindrical wedge for securing the head firmly on the inserted end of the handle comprising:
    a hollow cylindrical body driven coaxially into and substantially embedded in the end of the handle within the eye of the head with the hollow interior portion of the cylindrical body occupied by the wood core of the handle, and a tapered exterior portion of the body spreading the surrounding wood in compressed relationship within the eye, the hollow interior portion also defining a throat section at an intermediate position along the central axis of the cylindrical body to grip the core and firmly hold the wedge in the handle, the throat section being narrower in cross section than the sections of the hollow interior elsewhere along the central axis.

7. In combination in a tool having a tool head and handle, the improved cylindrical wedge of claim 6 wherein the cylindrical body has a substantially uniform wall thickness except for a cutting edge at the embedded end of the body for ease of penetration when the body is driven coaxially into the end of the handle in the eye of the tool head.

8. In combination in a tool having a tool head and handle, the improved cylindrical wedge of claim 6 wherein the exterior of the cylindrical body tapers inwardly toward the central axis at both ends of the body from an axial position intermediate the ends.

9. In combination in a tool having a tool head and handle, the improved cylindrical wedge of claim 6 wherein the hollow interior portion of the cylindrical body defines openings of substantially equal size at both axial ends of the body.

10. In combination in a tool having a tool head and handle, the improved cylindrical wedge of claim 6 wherein the throat section is located in the vicinity of the embedded end of the body and the size of the opening defined by the body at the embedded end is larger than the opening at the throat section.

11. The cylindrical wedge of claim 6 wherein the throat section is defined by smooth contours on the hollow interior portion of the cylindrical body and a tapered wall portion leading to a cutting edge at the embedded end.

12. A cylindrical wedge for use in securing a tool head on a wood handle comprising:

a cylindrical body having a hollow central bore and central axis extending between opposite axial ends of the body, and an exterior body surface with a substantial portion of the surface tapering inwardly toward the central axis of the body from a transverse section of the cylindrical body remote from one axial end to the opening of the bore at said one axial end; the thickness of the body between the hollow central bore and the exterior surface being substantially uniform throughout the body between the opposite axial ends except for a circumaxial cutting edge defined at said one axial end toward which the exterior surface tapers inwardly, and a throat section defined at an intermediate location of the central bore with a throat having a smaller cross sectional area than other sections of the bore between the opposite axial ends.

* * * * *